United States Patent
Reyneveld

(10) Patent No.: US 7,175,333 B2
(45) Date of Patent: Feb. 13, 2007

(54) METHOD FOR DELIVERY OF BULK CEMENT TO A JOB SITE

(76) Inventor: Willy Reyneveld, 2911 Landco, Bakersfield, CA (US) 93308

( * ) Notice: Subject to any disclaimer, the term of this patent is extended or adjusted under 35 U.S.C. 154(b) by 209 days.

(21) Appl. No.: 10/788,138

(22) Filed: Feb. 25, 2004

(65) Prior Publication Data

US 2005/0185502 A1    Aug. 25, 2005

(51) Int. Cl.
*B28C 7/04* (2006.01)
(52) U.S. Cl. .............. 366/8; 366/18; 366/26; 366/32
(58) Field of Classification Search .............. 366/1–8, 366/26, 18, 32, 114, 141, 183.1, 192
See application file for complete search history.

(56) References Cited

U.S. PATENT DOCUMENTS

| | | |
|---|---|---|
| 1,932,320 A | 10/1933 | Stewart |
| 2,218,106 A | 10/1940 | Grigsby |
| 3,189,327 A | 6/1965 | Domenighetti |
| 3,343,688 A | 9/1967 | Ross |
| 3,433,315 A | 3/1969 | Kohls et al. |
| 3,938,673 A | 2/1976 | Perry, Jr. |
| 4,506,983 A | 3/1985 | Marr |
| 4,594,046 A | 6/1986 | Bruder et al. |
| 4,922,463 A | 5/1990 | Del Zotto et al. |
| 4,953,752 A * | 9/1990 | Tousignant et al. |
| 4,956,821 A * | 9/1990 | Fenelon ................. 366/8 |
| 4,997,284 A * | 3/1991 | Tousignant et al. ........ 366/8 |
| 5,203,628 A | 4/1993 | Hamm |
| 5,303,998 A * | 4/1994 | Whitlatch et al. ........... 366/3 |
| 5,556,196 A * | 9/1996 | Lin .................... 366/18 |
| 5,624,183 A * | 4/1997 | Schuff ................. 366/20 |
| 5,785,420 A * | 7/1998 | Schuff ................. 366/20 |
| 5,813,754 A * | 9/1998 | Williams ................ 366/6 |
| 6,042,259 A * | 3/2000 | Hines et al. ............ 366/17 |
| 6,427,384 B1 | 8/2002 | Davis, Jr. |
| 6,808,303 B2 * | 10/2004 | Fisher ................. 366/26 |
| 2005/0185502 A1* | 8/2005 | Reyneveld .............. 366/192 |
| 2005/0219941 A1* | 10/2005 | Christenson et al. ........ 366/18 |

FOREIGN PATENT DOCUMENTS

| | | | |
|---|---|---|---|
| GB | 2119665 A | * | 11/1983 |
| GB | 2211829 A | * | 7/1989 |
| WO | 91/08882 | * | 6/1991 |

* cited by examiner

*Primary Examiner*—Charles E. Cooley
(74) *Attorney, Agent, or Firm*—Klein, DeNatale, et al.; James M. Duncan, Esq.

(57) ABSTRACT

A method for delivering a pre-weighed package comprising sand, aggregate and dry cement to a mixing site comprises the steps of preparing a first mixture comprising fine aggregate and coarse aggregate at an offsite plant. The first mixture is placed into a first storage compartment of a hopper and the load of dry cement is placed into a second storage compartment of the hopper. The hopper is transported to the mixing site, where the first mixture and the cement are discharged from the hopper and mixed to form a concrete slurry. The hopper comprises the first storage compartment and the second storage compartment, where there is a water tight divider separating the first storage compartment and the second storage compartment. The storage compartments have respective inlets and outlets for receiving and discharging the respective components.

28 Claims, 5 Drawing Sheets

METHOD FOR DELIVERY OF BULK CEMENT TO A JOB SITE

BACKGROUND OF THE INVENTION

The present invention relates to a method for delivery of concrete to a job site, and more particularly to a method by which the dry components of a concrete mixture are prepared in pre-weighed packages at a cement plant, delivered to the job site, and thereafter the dry components are blended together, mixed with water, and used as needed or desired. The logistics of providing concrete for a construction project can be quite complicated. Concrete is a mixture of a "paste" and aggregate, where the aggregate is typically a blend of coarse aggregate (gravel) and fine aggregate (sand). The paste, composed of portland cement and water, coats the surface of the fine and coarse aggregates. The paste hardens and gains strength to form concrete, a rock-like mass. Concrete therefore has the trait of being plastic and malleable when newly mixed, but strong and durable when hardened. Other additives or "admixes" may be added to provide various properties to the concrete, including water reducer, accelerant, retardant, foaming agents, and other density control additives.

Soon after the aggregate, water, and the cement are combined together as a slurry, the mixture starts to harden. During the chemical reaction of the cement with the water (i.e., hydration), a node forms on the surface of each cement particle. The node grows and expands until it links up with nodes from other cement particles or adheres to adjacent aggregates. This process results in the progressive stiffening and hardening of the slurry and the gradual development of strength in the slurry. Therefore, once the cement is placed into contact with water through the mixing of the slurry components, the concrete should be placed as desired before the slurry becomes too stiff to be properly placed.

It is important that the proper ratios of coarse aggregate, fine aggregate, cement and water be used in preparing the concrete slurry. The concrete slurry must be sufficiently workable for proper placement in the construction application, yet the hardened concrete must possess the required durability and strength for the application. A mixture which does not have sufficient paste to fill the voids between the aggregate components will be difficult to place and will produce rough honey-combed surfaces and porous concrete. However, a mixture with excess paste will be smoother and easier to place, but it is subject to shrinkage and is more expensive. Therefore, the methods of providing concrete to a job site must maintain the proper proportions of each of the components of the concrete. There are generally three different known methods for providing concrete to a construction site. In the first method, pre-measured sacks of dry cement and aggregate are delivered to the job site, where the sack is opened and mixed with water to create the concrete slurry. This method has the advantage of allowing the slurry to be mixed shortly before placement, allowing substantial time for placement of the slurry before the concrete begins to stiffen. However, this method has the disadvantage of being costly and labor intensive. Individual sacks of dry concrete are more expensive than concrete purchased in bulk. In addition to the added expense for packaging and handling, the aggregate in sack concrete must have a very low moisture content to prevent the cement from prematurely hydrating within the sack. The sacks are heavy, difficult to handle, and must be individually opened and mixed. A 94 pound sack of dry concrete when mixed with approximately 6 gallons of water yields less than 5 cubic feet of concrete.

It is to be appreciated that because a common cement truck holds 9.5 cubic yards of concrete slurry (i.e., approximately 256 cubic feet), one would have to mix over 50 individual sacks of cement to equal the volume of slurry delivered by a single cement truck. By way of example, a 4 inch thick 1800 square foot concrete pad requires over 22 cubic yards of concrete, requiring three cement trucks to deliver the concrete slurry. This same job would require mixing and placing approximately 120 sacks of cement. Because of these limitations, the sack method is generally limited to very small jobs.

The second method of providing concrete to a construction site is perhaps the most commonly used. In this method, concrete slurry comprising aggregate, cement and water is placed into cement trucks at a cement plant, and the trucks thereafter deliver the slurry to the job site. There are several disadvantages of this method. The concrete slurry should be poured within 90 minutes from the time the cement and aggregate are mixed with water. Therefore, the distance of the job site from the cement plant can limit or prevent use of this method. If the truck is delayed by traffic or other reasons and the concrete slurry not placed within the required time window, the concrete slurry cannot be used and it becomes waste material. Not only is the concrete lost, but it must then also be transported to a proper disposal site.

Typically, it is desired that concrete be delivered to the construction site first thing in the morning. Accordingly, demand for concrete at the cement plant is high in the early morning. A cement plant might have a capacity of loading 15 to 20 trucks per hour. Depending upon the demand, there may be congestion at the cement plant, with a large number of cement trucks idling and waiting for concrete. If a particular construction project has a large demand for concrete, the number of trucks required to deliver concrete can be large, consuming large amounts of fuel, and emitting pollutants.

The third method of delivering concrete to a construction site is only practical for very large construction projects. This method is to set up a portable plant on the job site, with separate bulk storage for each of the concrete components. The components are thereafter weighed, blended and mixed on the job site as required for the construction. While this method has the advantage of providing concrete on an as-needed basis, it is prohibitively expensive except for large projects.

SUMMARY OF THE INVENTION

The present invention is directed to a method which meet the needs identified above for delivery of concrete to construction sites. A method for delivering a pre-weighed package comprising sand, aggregate and dry cement to a mixing site is disclosed. One embodiment of the method comprises the steps of preparing a first mixture comprising fine aggregate and coarse aggregate at an offsite plant. This first mixture is weighed. A load of dry cement is weighed. The first mixture is placed into a first storage compartment of a bulk transport apparatus (i.e. a hopper). The load of dry cement is placed into a second storage compartment of the bulk transport apparatus. The bulk transport apparatus is loaded onto transportation means with lifting means. The bulk transport apparatus is transported by the transportation means to the mixing site, which is at or convenient to the job site. The first mixture is discharged from the first storage means of the bulk transport apparatus into mixing means. Likewise, the dry cement is discharged from the second storage means of the bulk transport apparatus into the mixing means. The first mixture and cement are mixed with water to achieve the desired slurry properties and the concrete slurry is thereafter poured as desired.

In this method, the bulk transport apparatus utilized in the method comprises the first storage compartment and the second storage compartment, where there is a water tight dividing means separating the first storage compartment and the second storage compartment. The first storage compartment has a first inlet for receiving the first mixture and a first outlet for discharging the first mixture. The second storage compartment has a second inlet for receiving the load of dry cement and a second outlet for discharging the load of dry cement. The bulk transport apparatus further comprises means for attachment of the apparatus to a lifting means.

These and other features, aspects, and advantages of the present invention will become better understood with regard to the following description, appended claims, and accompanying drawings.

DETAILED DESCRIPTION OF THE EMBODIMENTS

Figure 1:
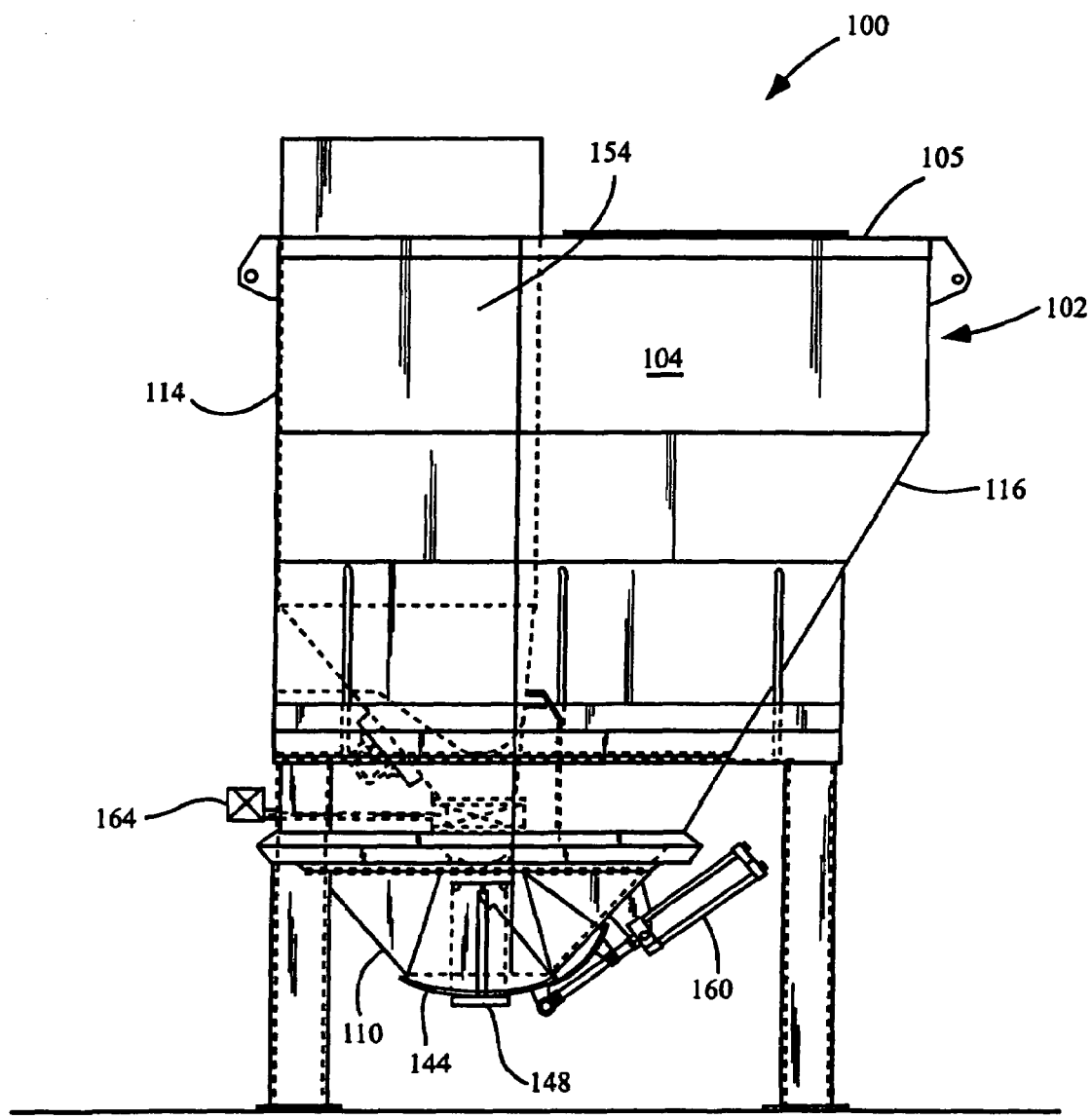
FIG. 1 is a side view of one embodiment of a bulk transport apparatus which may be utilized in a method of the invention.
Figure 2:
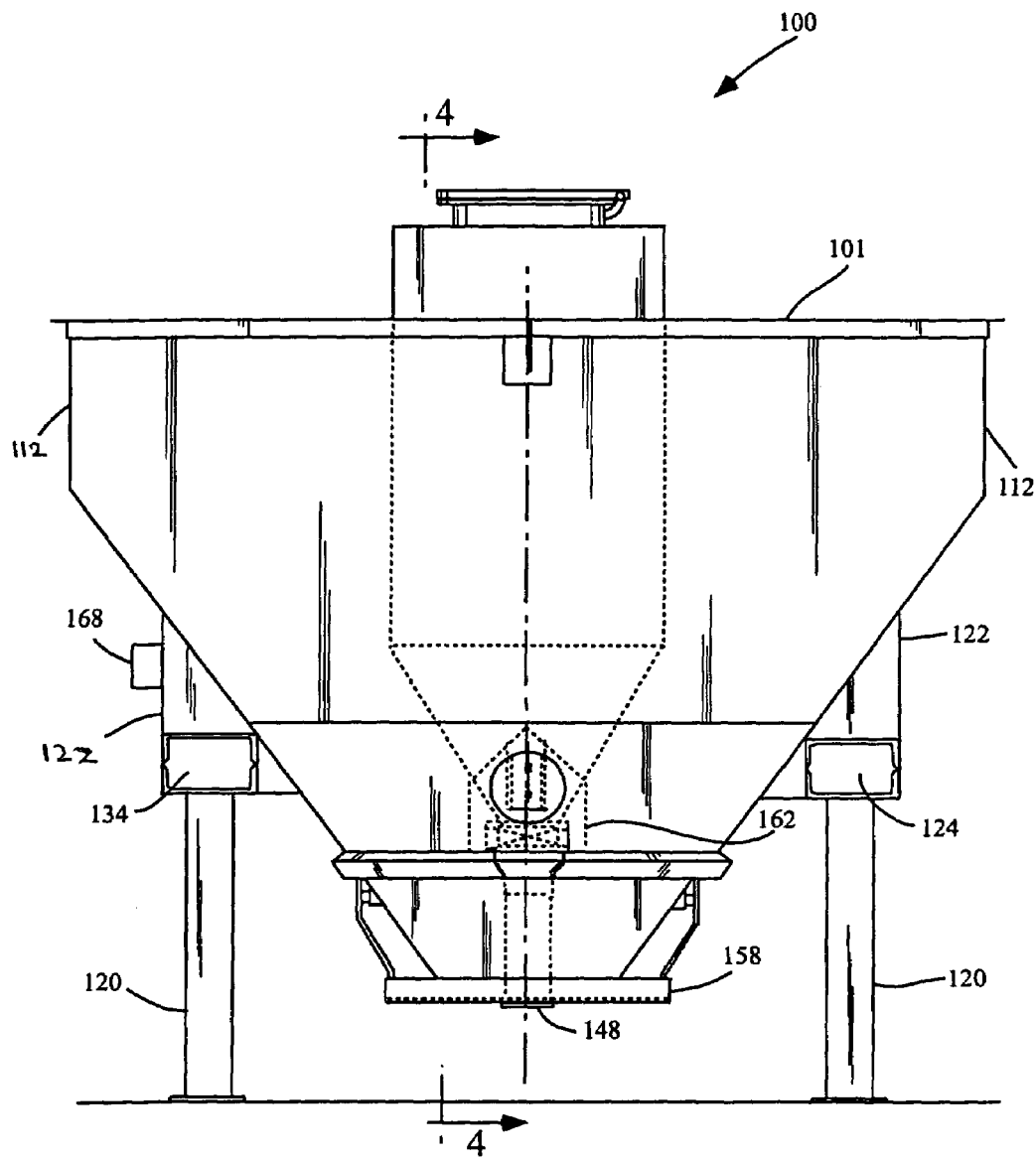
FIG. 2 is a front view of the embodiment of the bulk transport apparatus depicted in FIG. 1.
Figure 3:
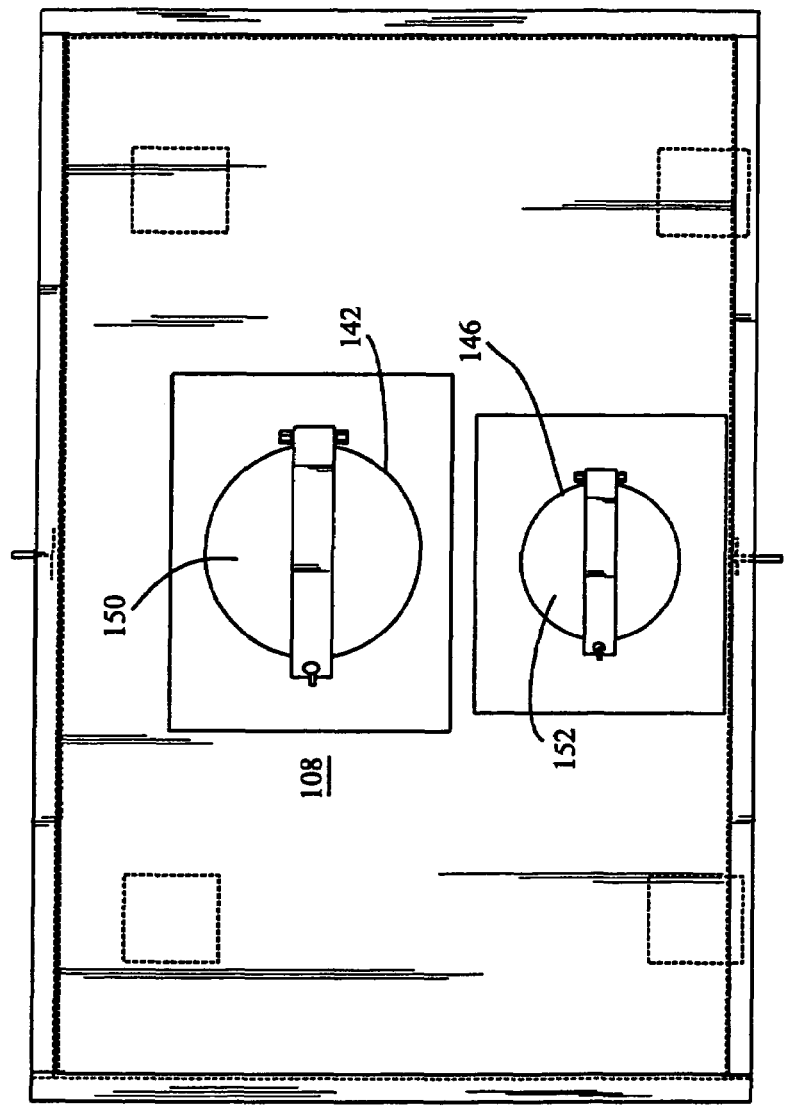
FIG. 3 is a top view of the embodiment of the bulk transport apparatus depicted in FIG. 1.

Referring now specifically to the drawings, FIGS. 1 through 6 show an embodiment 100 of an apparatus which may be utilized in a method of the invention. This apparatus, hereinafter referred to as the hopper, comprises a shell 102 having an outside surface 104, an inside surface 106, a top 108 and a bottom 110. As generally shown in the drawings, the shell 102 may be in the approximate shape of an inverted pyramid having a generally rectangular top 108 and bounded by opposite-facing and matching sides 112. The sides 112 may taper inwardly as the sides 112 extend toward the bottom 110 as shown in FIG. 2. The back 114 of the shell may be substantially vertical as shown in FIG. 1, while the front 116 may taper inwardly as the front extends from the top 108 toward the bottom 110. While many materials may be used for shell 102, 3/16" thick mild steel is an appropriate material. The hopper 100 may be constructed to hold different volumes of cement and aggregate, which typically will range from 3 to 5 cubic yards, or roughly a third to one half the volume of the commonly known cement truck.

Figure 6:
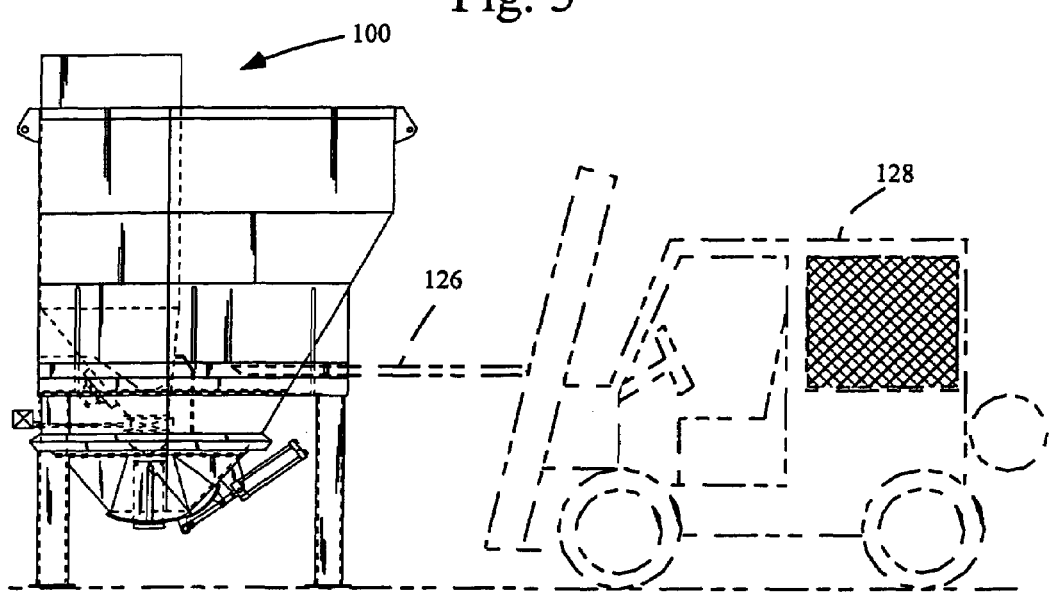
FIG. 6 shows how the bulk transport apparatus may be lifted by a forklift.

The shell 102 may be supported by various support members or structures attached to the outside surface 104 of the shell 102. For example, as shown in the drawings, the shell may be cradled within support structure 118. Support structure 118 comprises vertical legs 120 which are attached at the upper end of each vertical leg to cradle support 122. Cradle support 122 engages and supports shell 102. Cradle support 122 has openings 124 which are generally oriented outside of and parallel to sides 112. As shown in FIG. 6, openings 124 are of a dimension to receive the forks 126 of a lifting means, such as a forklift 128. Vertical legs 120 have feet 130 at the lower end of each leg to support the entire hopper 100. This configuration of the hopper 100 allows the device to be lifted by a forklift 128 onto transportation means, such as a flat bed truck 132, or alternatively, a railroad flat car or other conveyance for transportation to the desired job site. Alternatively, the hopper 100 may be lifted by a crane or boom, with lifting cables attached to lifting eyes 134. The lifting eyes 134 may also be used in conjunction with tie-downs to secure the hopper 100 to the flat bed truck 132.

The hopper 100 comprises a first storage compartment 136 and a second storage compartment 138, which are defined by a water tight dividing means, such as dividing wall 140. The water tight dividing means keeps the fine and coarse aggregate separated from the cement, which is often necessary because the moisture content of the aggregate may be sufficiently high to initiate the hydration of the cement. The first storage compartment 136 is formed between the inside surface 106 of the shell 102 and dividing wall 140. A first inlet 142 extends through the top 108 of the shell 102 providing access into the first compartment 136. A first outlet 144 extending through the shell 102, provides an outlet at the bottom 110 of the shell for materials stored within the first storage compartment 136. The second storage compartment 138 is on the opposite side of dividing wall 140 from the first storage compartment 136. A second inlet 146 extends through the top 108 of the shell 102 providing access into second storage compartment 138. A second outlet 148 extends through shell 102, providing an outlet at the bottom 110 of the shell for materials stored within the second storage compartment 138. First inlet 142 and second inlet 146 may be respectively covered with first removable cover 150 and second removable cover 152. However, while the drawings show first inlet 142 being covered with first removable cover 150, it is to be appreciated that first inlet 142 does not necessarily require cover 150 and the first inlet may comprise the rectangular opening of top 108 excluding second inlet 146 and its supporting structure, thereby simplifying the loading of first storage compartment 136. In this configuration, a cover may be fabricated which simply fits over the first inlet 142. In common usage, first storage compartment 136 will be used to store a first mixture comprising a blend of fine aggregate and coarse aggregate. It may be most convenient to load the first storage compartment 136 through a first inlet 142 having a large cross-sectional area.

For construction purposes, it may be advantageous for either the first storage compartment 136 or the second storage compartment 138 to comprise a vessel enclosed within shell 102. For example, the drawings generally depict second storage compartment 138 as a vessel 154. However, it is to be appreciated that the second storage compartment 138 may be formed simply by means of fabricating dividing wall 140 within shell 102, thereby defining two separate compartments. As generally shown in the drawings, vessel 154 may be generally cylindrical in shape, and may be tapered or funneled at the bottom 156 of the vessel. As shown in the drawings, first outlet 144 and second outlet 148 may coincide, such that one of the outlets is defined by the annulus formed between the shell 102 and the other outlet. For example, as shown in the drawings, first outlet 144 may comprise the annulus between shell 102 and second outlet 148.

While first outlet 144 may be simply sealed with a plate, screwable cap or other sealing means, alternatively a first valve means may be used to allow for material to flow from the first storage compartment 136 through the first outlet 144 to the outside of the hopper 100. For example, as shown in FIGS. 1 and 2, first outlet 144 may be closed by gate 158 which may be disposed across first outlet 144 to contain materials within the first storage compartment 136, and pivotally retracted to allow materials to flow through the first outlet. While gate 158 may be operated manually, alternatively, as further shown in FIGS. 1 and 2, a first actuation means 160 may be used in conjunction with gate 158 to open and close the valve. The actuation means is an actuator of the type generally known in the art, which may be activated either pneumatically or hydraulicly. The air or hydraulic power source for the actuation means is of the type generally known in the art.

Likewise, second outlet 148 may comprise a second valve means to allow material to flow from the second storage compartment 138 through the second outlet 148 to the outside of the hopper 100. For example, as shown schematically in FIGS. 1 and 2, second outlet 148 may be closed by butterfly valve 162, which may be rotated to either an open or closed position. Butterfly valve 162 may used in conjunction with a second actuation means 164 to either open or close the valve. The actuation means is of the type generally known in the art, and may be activated either pneumatically or hydraulicly. The air or hydraulic power source for the actuation means is of the type generally known in the art.

Figure 4:
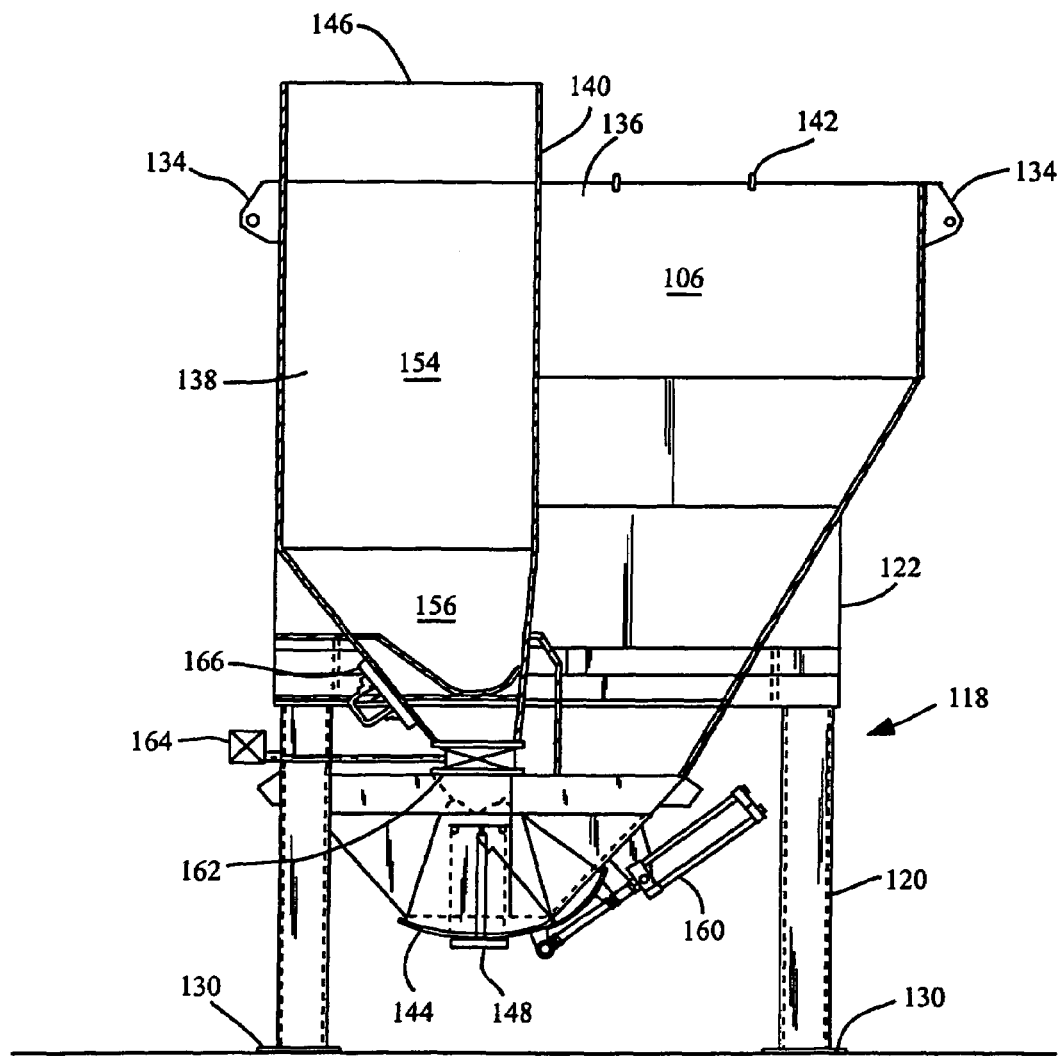
FIG. 4 is a cross-section taken along line 4—4 of FIG. 2.
Figure 5:
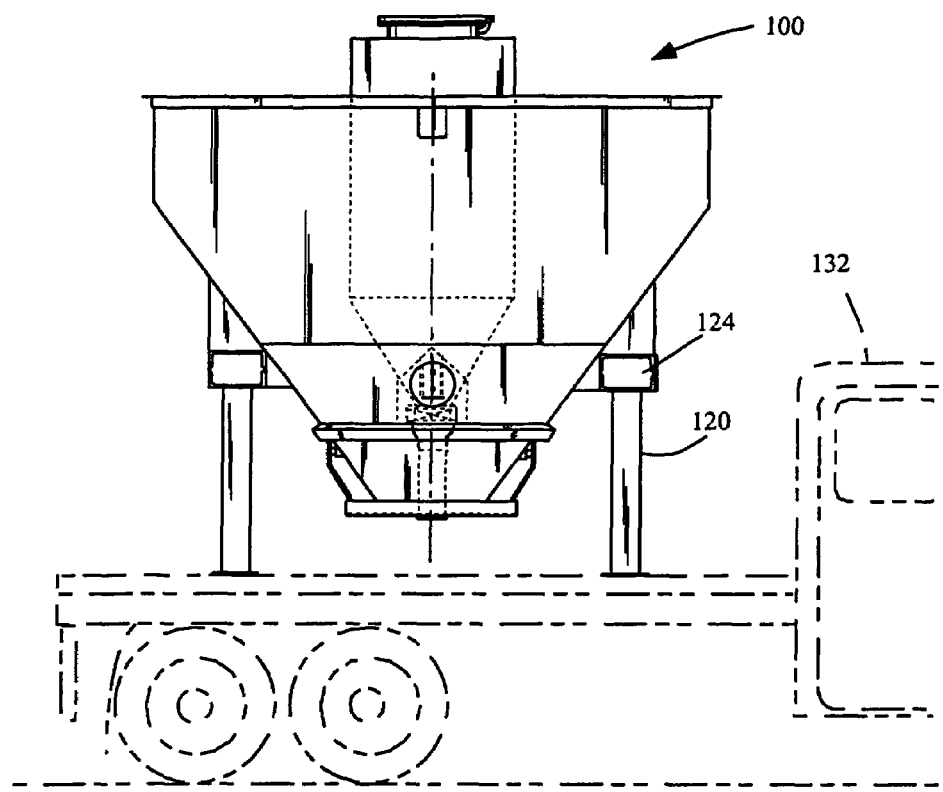
FIG. 5 shows the bulk transport apparatus loaded on a truck.

The hopper 100 may further comprise means for vibrating different components of the apparatus. FIG. 4 shows vibrating unit 166 attached to vessel 154, although it should be appreciated that the same vibrating unit could be attached to various portions of shell 102 so as to vibrate the first storage compartment 136 or second storage compartment 138 in order to assist unloading of materials contained within either of the storage compartments. The vibrating unit may be of the pneumatic variety, such as those available from the ARNOLD COMPANY of Trenton, Ill.

The hopper may also comprise weigh document storage means, such as lock box 168, which may be attached to either the outside surface of the shell 102 or to the support structure 118. The purpose of the document storage means is to store weigh documents which are prepared when the apparatus is loaded with the desired cement and aggregate components, where the respective weights of each component are determined at the cement plant and recorded on the documents. These documents thereafter accompany the concrete package contained within the hopper to the job site, where the documents may be referred to for control purposes and for determining the volume of water required for mixing the concrete slurry.

A method for delivering a pre-weighed package for mixing concrete at a job site is realized using the hopper 100 described above. The pre-weighed package, which is prepared at the cement plant, comprises fine aggregate, coarse aggregate and dry cement. A first mixture is prepared which comprises a blend of fine aggregate and coarse aggregate. This first mixture is weighed and placed into one of the storage compartments of the hopper 100. For purposes of describing the method, it will be assumed that the first mixture is placed within the first storage compartment 136, although the second storage compartment 138 could also be used for storing the first mixture. A load of dry cement is weighed and placed within the other storage compartment of the hopper 100, which is assumed, for purposes of this example, to be the second storage compartment 138. The hopper is loaded onto transportation means, such as a flatbed truck 132, or a railroad flat car for delivery to the mixing site. A lifting means, such as forklift 128, is used to lift the hopper 100 onto the transportation means. It is to be appreciated that, depending upon the configuration of the cement plant, that the hopper 100 may be loaded either before or after it is loaded with the first mixture and/or the cement.

Once loading of the hopper 100 has been completed and weigh documents generated, the hopper is transported to a mixing site, which should be conveniently located to the site where the mixed concrete is required. Mixing means, such a conventional cement mixing trucks or mixers may be used to receive the first mixture and cement from the hopper, which may be lifted by forklift 128 or other lifting means such that the first outlet 144 and second outlet 148 are positioned to discharge the first mixture and cement into the mixing means.

Various admix may either be blended in with the first mixture at the cement plant when the first mixture is loaded into the hopper. Alternatively, the admix may be added with the mixing water to the first mixture and the cement. The admix may comprise any one or a combination of the following substances: water reducer, water replacer, accelerant, retardant, extender, shrinkage reducer, air entrainer, strengthener, and porosity reducer.

While the above is a description of various embodiments of the present invention, further modifications may be employed without departing from the spirit and scope of the present invention. For example, the size, shape, and/or material of the various components may be changed as desired. Thus the scope of the invention should not be limited by the specific structures disclosed. Instead the true scope of the invention should be determined by the following claims.

What is claimed is:

1. A method for delivering a pre-weighed package comprising fine aggregate, coarse aggregate and dry cement to a mixing site, the method comprising the steps of:
    (a) preparing a first mixture comprising fine aggregate and coarse aggregate;
    (b) weighing the first mixture;
    (c) weighing a load of the dry cement;
    (d) placing the first mixture into a first storage compartment of a bulk transport apparatus and placing the load of dry cement into a second storage compartment of the bulk transport apparatus, the bulk transport apparatus comprising: (i) an outer shell having a top and a bottom, (ii) a water tight dividing means contained inside the shell, the water tight dividing means defining the first storage compartment and the second storage compartment; (iii) the first storage compartment having a first inlet for receiving the first mixture and a first outlet for discharging the first mixture; (iv) the second storage compartment having a second inlet for receiving the load of dry cement and a second outlet for discharging the load of dry cement; and (v) means for attachment to a lifting means connected to the outer shell;
    (e) loading the bulk transport apparatus onto transportation means with the lifting means;
    (f) transporting the bulk transport apparatus to the mixing site;
    (g) discharging the first mixture through the first outlet into a mixing means; and
    (h) discharging the load of dry cement through the second outlet into the mixing means.

2. The method of claim 1 wherein a weigh document is generated when the first mixture and the load of dry cement are weighed.

3. The method of claim 1 wherein the first storage compartment comprises a vessel enclosed within the shell.

4. The method of claim 1 wherein the second storage compartment comprises a vessel enclosed within the shell.

5. The method of claim 1 wherein the bulk transport apparatus further comprises means for vibrating the first storage compartment.

6. The method of claim 1 wherein the bulk transport apparatus further comprises means for vibrating the second storage compartment.

7. The method of claim 1 wherein the bulk transport apparatus further comprises a means for opening and closing the first outlet.

8. The method of claim 7 wherein the means for opening and closing the first outlet comprises a gate pivotally attached to the shell.

9. The method of claim 1 wherein the bulk transport apparatus further comprises a means for opening and closing the second outlet.

10. The method of claim 9 wherein the means for opening and closing the second outlet comprises a butterfly valve.

11. The method of claim 1 wherein the first mixture comprises an admix.

12. The method of claim 11 wherein the admix is selected from the group consisting of water reducer, water replacer, accelerant, retardant, extender, shrinkage reducer, air entrainer, strengthener, and porosity reducer.

13. The method of claim 11 wherein the admix is selected from any one or more of the group comprising water reducer, water replacer, accelerant, retardant, extender, shrinkage reducer, air entrainer, strengthener, and porosity reducer.

14. A method for delivering a pre-weighed package comprising fine aggregate, coarse aggregate and dry cement to a mixing site, the method comprising the steps of:
    (a) preparing a first mixture comprising fine aggregate and course aggregate;
    (b) weighing the first mixture;
    (c) weighing a load of the dry cement;
    (d) placing the first mixture into a first storage compartment of a bulk transport apparatus and placing the load of dry cement into a second storage compartment of the bulk transport apparatus, the bulk transport apparatus comprising: (i) an outer shell having a top and a bottom, (ii) a water tight dividing means contained inside the shell, the water tight dividing means defining the first storage compartment and the second storage compartment wherein the second storage compartment comprises a vessel; (iii) the first storage compartment having a first inlet for receiving the first mixture and a first outlet for discharging the first mixture; (iv) the second storage compartment having a second inlet for receiving the load of dry cement and a second outlet for discharging the load of dry cement; and (v) means for attachment to a lifting means connected to the outer shell;
    (e) loading the bulk transport apparatus onto transportation means with the lifting means;
    (f) transporting the bulk transport apparatus to the mixing site;
    (g) discharging the first mixture through the first outlet into a mixing means; and
    (h) discharging the load of dry cement through the second outlet into the mixing means.

15. The method of claim 14 wherein a weigh document is generated when the first mixture and the load of dry cement are weighed.

16. The method of claim 14 wherein the vessel is cylindrical.

17. The method of claim 16 wherein the vessel comprises a tapered bottom.

18. The method of claim 14 wherein the bulk transport apparatus further comprises means for vibrating the first storage compartment.

19. The method of claim 14 wherein the bulk transport apparatus further comprises means for vibrating the second storage compartment.

20. The method of claim 14 wherein the bulk transport apparatus further comprises a first valve means attached to the first outlet.

21. The method of claim 20 wherein the first valve means comprises a gate pivotally attached to the shell.

22. The method of claim 20 wherein the bulk transport apparatus further comprises a first actuation means for opening and closing the first valve means.

23. The method of claim 14 wherein the bulk transport apparatus further comprises a second valve means attached to the second outlet.

24. The method of claim 23 wherein the second valve means comprises a butterfly valve.

25. The method of claim 23 wherein the bulk transport apparatus further comprises a second actuation means for opening and closing the second valve means.

26. The method of claim 14 wherein the bulk transport apparatus further comprises support members attached to the outer shell.

27. The method of claim 14 wherein the bulk transport apparatus further comprises a first removable cover on the first inlet.

28. The method of claim 14 wherein the bulk transport apparatus further comprises a second removable cover on the second inlet.

* * * * *